(12) United States Patent
Yamaki

(10) Patent No.: US 10,952,060 B2
(45) Date of Patent: Mar. 16, 2021

(54) COMMUNICATION APPARATUS, COMMUNICATION METHOD, AND PROGRAM

(71) Applicant: CANON KABUSHIKI KAISHA, Tokyo (JP)

(72) Inventor: Tomokazu Yamaki, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 12 days.

(21) Appl. No.: 16/414,277

(22) Filed: May 16, 2019

(65) Prior Publication Data

US 2019/0274048 A1 Sep. 5, 2019

Related U.S. Application Data

(63) Continuation of application No. 15/200,690, filed on Jul. 1, 2016, now abandoned.

(30) Foreign Application Priority Data

Jul. 6, 2015 (JP) .................................. 2015-135681

(51) Int. Cl.
| | |
|---|---|
| *H04W 12/06* | (2009.01) |
| *H04W 8/18* | (2009.01) |
| *H04W 8/00* | (2009.01) |
| *G06K 7/14* | (2006.01) |
| *G06K 19/06* | (2006.01) |
| *H04W 12/04* | (2021.01) |
| *H04W 28/02* | (2009.01) |
| *H04W 8/24* | (2009.01) |

(52) U.S. Cl.
CPC .......... *H04W 8/005* (2013.01); *G06K 7/1447* (2013.01); *G06K 19/06037* (2013.01); *H04W 12/0401* (2019.01); *H04W 8/24* (2013.01)

(58) Field of Classification Search
None
See application file for complete search history.

(56) References Cited

U.S. PATENT DOCUMENTS

| | | | | |
|---|---|---|---|---|
| 8,289,890 | B2 * | 10/2012 | Murayama ............ | H04W 76/11 370/310 |
| 9,642,003 | B2 * | 5/2017 | Raman .................. | H04L 63/101 |
| 10,098,056 | B2 * | 10/2018 | Gupta ................... | H04W 48/14 |
| 10,511,693 | B2 * | 12/2019 | Shimada ............... | G06F 3/1292 |

(Continued)

*Primary Examiner* — Venkat Perungavoor
(74) *Attorney, Agent, or Firm* — Canon U.S.A., Inc. IP Division

(57) ABSTRACT

A communication apparatus includes an acquisition unit that acquires identification information from a first different communication apparatus, a determination unit that determines whether the acquired identification information is first identification information, a reception unit that receives, from the first different communication apparatus, a predetermined request to connect a second different communication apparatus to a wireless network generated by the communication apparatus, and a providing unit that, in a case where the identification information is the first identification information, provides the second different communication apparatus with a communication parameter for connecting to the wireless network in response to receipt of the predetermined request.

9 Claims, 6 Drawing Sheets

(56) References Cited

U.S. PATENT DOCUMENTS

| | | | |
|---|---|---|---|
| 2013/0016710 A1* | 1/2013 | Shinohara | H04M 1/7253 370/338 |
| 2013/0170387 A1* | 7/2013 | Wang | H04W 4/70 370/252 |
| 2014/0342670 A1* | 11/2014 | Kang | H04M 1/7253 455/41.2 |
| 2016/0242137 A1* | 8/2016 | Benoit | H04L 12/2809 |
| 2018/0077572 A1* | 3/2018 | Trappitt | G06Q 30/0267 |
| 2019/0014459 A1* | 1/2019 | Zong | H04W 76/14 |
| 2019/0090291 A1* | 3/2019 | Jain | H04W 92/10 |
| 2019/0149994 A1* | 5/2019 | Van Antwerp | H04W 12/12 726/4 |

* cited by examiner

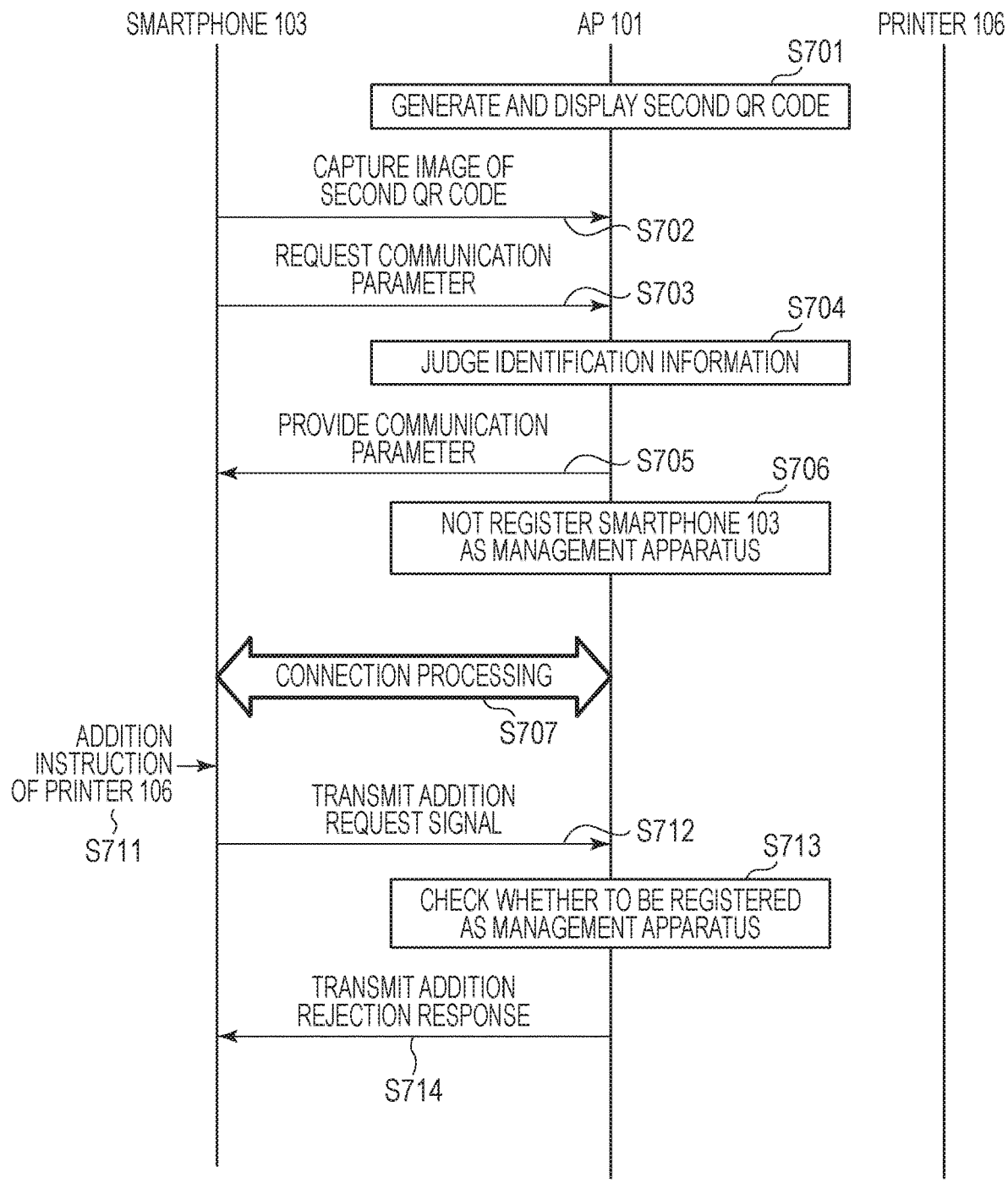

COMMUNICATION APPARATUS, COMMUNICATION METHOD, AND PROGRAM

CROSS-REFERENCE TO RELATED APPLICATIONS

This application is a continuation of U.S. patent application Ser. No. 15/200,690, which was filed on Jul. 1, 2016 and which claims priority to Japanese Patent Application No. 2015-135681, which was filed on Jul. 6, 2015 and which is hereby incorporated by reference herein in its entirety.

BACKGROUND

Field

Aspects of the present invention generally relate to a communication apparatus providing a communication parameter.

Description of the Related Art

Communication parameters such as a network identifier, an encryption key, and an encryption method need to be set to a communication apparatus to connect the communication apparatus to a wireless network. There is a technique in which a base station provides an external apparatus to be connected to a wireless network with a communication parameter in order to simplify the setting of the communication parameter (U.S. Patent Application Publication No. 2011/0255398). In U.S. Patent Application Publication No. 2011/0255398, the base station provides the external apparatus with the communication parameter in response to a starting instruction from a different communication apparatus.

When the base station provides the external apparatus with the communication parameter in response to the starting instruction from the different communication apparatus, an administrator of the wireless network may unintentionally provide an external apparatus with the communication parameter. When the communication parameter is unintentionally provided to an external apparatus, there is a possibility that the unexpected external apparatus may be connected to the wireless network, and accordingly, security of the wireless network is lowered.

Thus, it is preferable that a different communication apparatus that is allowed to request the base station to provide the communication parameter to the external apparatus can be limited.

In view of the aforementioned, a simple method is needed that enhances security while maintaining convenience by providing a communication parameter by a base station.

SUMMARY

A communication apparatus according to an aspect of the invention includes an acquisition unit configured to acquire identification information from a first different communication apparatus, a determination unit configured to determine whether the identification information acquired by the acquisition unit is first identification information, a reception unit configured to receive, from the first different communication apparatus, a predetermined request to connect a second different communication apparatus to a wireless network generated by the communication apparatus, and a providing unit configured to, in a case where the identification information is the first identification information, provide the second different communication apparatus with a communication parameter for connecting to the wireless network in response to receipt of the predetermined request, wherein in a case where the identification information is not the first identification information, the second different communication apparatus is not provided with the communication parameter even upon receipt of the predetermined request.

Further features of aspects of the present invention will become apparent from the following description of exemplary embodiments with reference to the attached drawings.

BRIEF DESCRIPTION OF THE DRAWINGS

FIG. 7 is a sequence chart between communication apparatuses.

DESCRIPTION OF THE EMBODIMENTS

Figure 1:
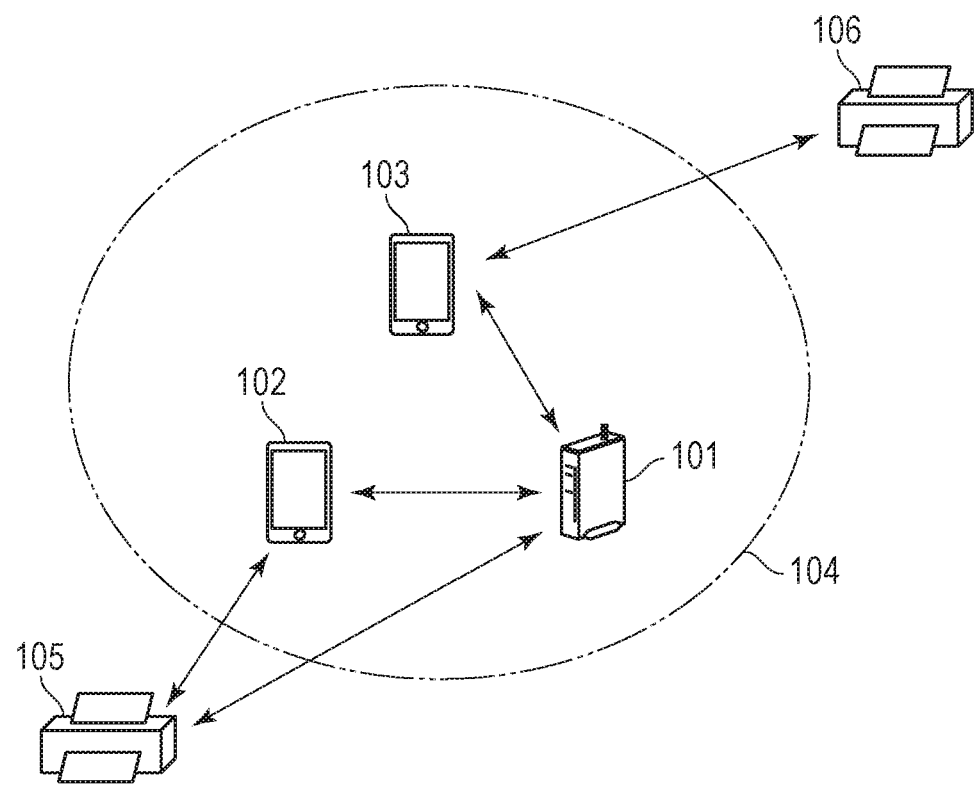
FIG. 1 illustrates a configuration of a communication system.

A configuration of a communication system is illustrated in FIG. 1. This communication system includes an access point (hereinafter, an AP) 101, and communication apparatuses such as a smartphone 102, a smartphone 103, a printer 105, and a printer 106. Note that a wireless network 104 is a wireless LAN generated by the AP 101 conforming to the IEEE 802.11 series standard.

While the following description presumes that the communication apparatuses conform to the IEEE 802.11 series standard, communication apparatuses conforming to other wireless communication methods such as Bluetooth®, ZigBee®, UWB (including wireless USB, wireless 1394, WINET, etc.), and Multi Band OFDM Alliance (MBOA), etc. are applicable. Wired communication methods, such as wired LAN, are also applicable.

The AP 101 operates as an access point in an infrastructure mode defined by the IEEE 802.11 standard. The AP 101 may operate as a group owner defined by the Wi-Fi Direct® standard. Here, such access points are collectively called base stations. A base station determines a communication channel for generating a wireless network, generates the wireless network by the determined communication channel, and periodically transmits a beacon.

A different communication apparatus operates as a station (hereinafter, STA) in the infrastructure mode defined by the IEEE 802.11 standard. Different communication apparatuses may operate as clients defined by the Wi-Fi Direct® standard. Here, such communication apparatuses are collectively called terminals. A terminal is connected to the wireless network generated by the base station to perform wireless communication with the base station. The terminal is also able to communicate with other terminals joining the wireless network through the base station.

The following description presumes that the communication apparatus is an AP, a smartphone, or a printer. However, any other type of device, such as a camera, a cellular phone, a PC, a video camera, a smart watch, a PDA, etc., may be considered as the communication apparatus.

Figure 2:
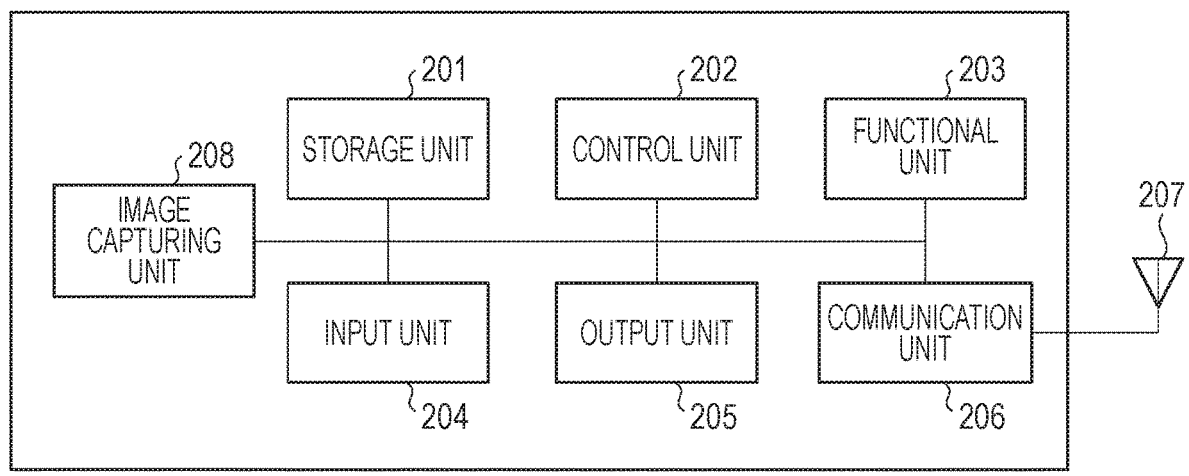
FIG. 2 illustrates a hardware configuration of a communication apparatus.

FIG. 2 illustrates a hardware configuration of a communication apparatus. A storage unit 201 includes a ROM or a RAM, and stores therein various kinds of information such as programs to perform various operations described below and communication parameters for wireless communication. Note that, storage media such as a flexible disk, a hard disk, an optical disk, a magneto-optical disk, a CD-ROM, a CD-R, a magnetic tape, a non-volatile memory card, or a DVD may be used as the storage unit 201 in addition to memories such as a ROM and a RAM.

A control unit 202 includes a CPU or an MPU, and controls the communication apparatus by executing a program stored in the storage unit 201. The communication apparatus may be controlled in cooperation with an OS (Operating System) executed by the control unit 202.

The control unit 202 controls a functional unit 203 to execute predetermined processing, such as photography, printing, or projection. The functional unit 203 is hardware for executing predetermined processing by the communication apparatus. For example, when the communication apparatus is a printer, the functional unit 203 is a print unit that performs print processing. When the communication apparatus is a smartphone, the functional unit 203 is a Long Term Evolution (LTE) communication unit and is able to communicate with an external apparatus through an LTE line. Other communication units, such as 3G 5G, or the like may be used instead of LTE. When the communication apparatus is a projector, the functional unit 203 is a projection unit that performs projection processing.

Data processed by the functional unit 203 may be data stored in the storage unit 201 or data communicated with a different communication apparatus through a communication unit 206 described below.

An input unit 204 receives various operations from a user. An output unit 205 performs various outputs, such as display on a screen, to the user. The outputs are not limited to displaying on a screen, and may include a voice output by a speaker, a vibration output, and the like. Both the input unit 204 and the output unit 205 may be realized by a single entity, such as a touch panel.

The communication unit 206 performs control of wireless communication conforming to the IEEE 802.11 series and control of IP communication. In addition, the communication unit 206 controls an antenna 207 to perform transmission and reception of a wireless signal for wireless communication. An image capturing unit 208 includes an image capturing device, a lens, and the like, and captures still and moving images. In the present embodiment, the image capturing unit 208 captures an image of a QR Code®. The image capturing unit 208 can also capture a bar code image, a two-dimensional code, or the like.

All the aforementioned components of the hardware configuration do not need to be included. A plurality of hardware blocks may be realized as one hardware block or one hardware block may be realized as a plurality of hardware blocks.

Figure 3:
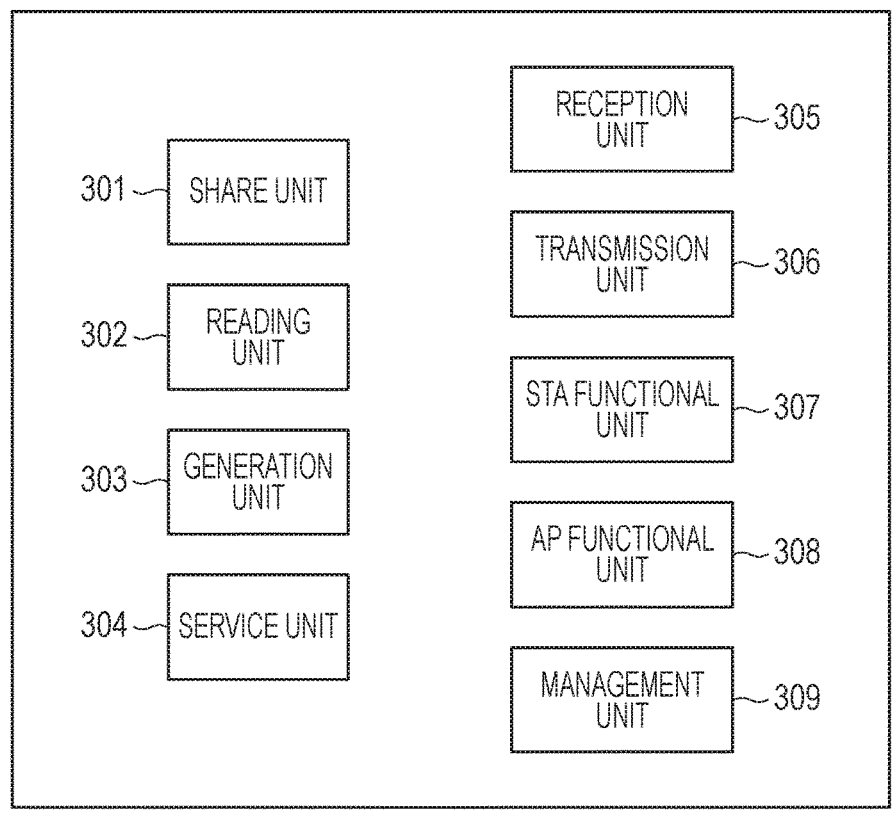
FIG. 3 is a functional block diagram of the communication apparatus.

FIG. 3 illustrates a configuration of functional blocks of software of the communication apparatus. All the functional blocks can be implemented as software or hardware. Specifically, the control unit 202 realizes each function by reading and executing a program stored in the storage unit 201. A plurality of functional blocks may constitute one functional block or one functional block may be constituted as a plurality of functional blocks.

A part or all of the functional blocks may be implemented as hardware. For example, a dedicated circuit may be generated automatically on a Field Programmable Gate Array (FPGA) from a program for realizing each step by using a predetermined compiler. The functional blocks may be realized as hardware by generating a gate array circuit similar to the FPGA. The functional blocks may be implemented by an ASIC (Application Specific Integrated Circuit).

A share unit 301 performs communication parameter share processing for sharing communication parameters between communication apparatuses. Here, the communication parameter share processing is performed using WPS (Wi-Fi Protected Setup®) defined by the Wi-Fi® Alliance. The parameter share processing may be performed by using other share and setting methods such as AOSS, without limitation to the WPS.

In the communication parameter share processing, a providing apparatus provides a receiving apparatus with communication parameters for performing wireless communication. In this case, a base station operates as the providing apparatus and a terminal operates as the receiving apparatus.

The communication parameters include SSID (Service Set Identifier) as a network identifier, an encryption method, an encryption key, an authentication method, and an authentication key. A MAC address as an identifier of a communication apparatus and an IP address for performing communication in an IP layer may be included as the communication parameters.

Further, information indicating whether to use DHCP or Auto IP as an allocation method of an IP address may be included in the communication parameters. When the DHCP is used as the allocation method, information indicating which apparatus is a DHCP server or a client may be added. In addition, for example, identification information and authentication information of Bluetooth®, which is another wireless method different from the IEEE 802.11 series, may be included. Information of functions of the communication apparatus may be included.

A reading unit 302 analyzes the QR Code®, the image of which is captured by the image capturing unit 208, and acquires information included in the code. A generation unit 303 generates a QR Code® and performs control for displaying the QR Code® on the output unit 205. A bar code or a two-dimensional code may be analyzed or generated instead of the QR Code®.

A service unit 304 provides service in an application layer by using wireless communication by the communication unit 206. In this case, the application layer is a layer of a fifth layer or higher in an OSI reference model. Specifically, the service unit 304 provides service such as print processing, image streaming processing, or file transfer processing.

A reception unit 305 and a transmission unit 306 control the communication unit 206 to perform reception and transmission of packets conforming to the IEEE 802.11 series standard from and to another external apparatus. The reception unit 305 and the transmission unit 306 also perform communication control of packets in an IP layer.

An STA functional unit 307 causes the communication apparatus to operate as a terminal and performs authentication processing, encryption processing, and the like with respect to the base station. An AP functional unit 308 generates a wireless network and manages a terminal in the wireless network. The AP functional unit 308 also performs authentication processing and encryption processing with respect to the terminal.

A management unit 309 registers and manages a communication apparatus that requests the communication apparatus to connect an external apparatus to the wireless network generated by the base station (hereinafter, referred to as a management apparatus).

All the aforementioned functional blocks do not need to be included. For example, in the case of the AP 101, the reading unit 302 or the STA functional unit 307 do not need to be included. In the case of the smartphone 102, the smartphone 103, the printer 105, and the printer 106, the generation unit 303 or the AP functional unit 308 do not need to be included.

Figure 4:
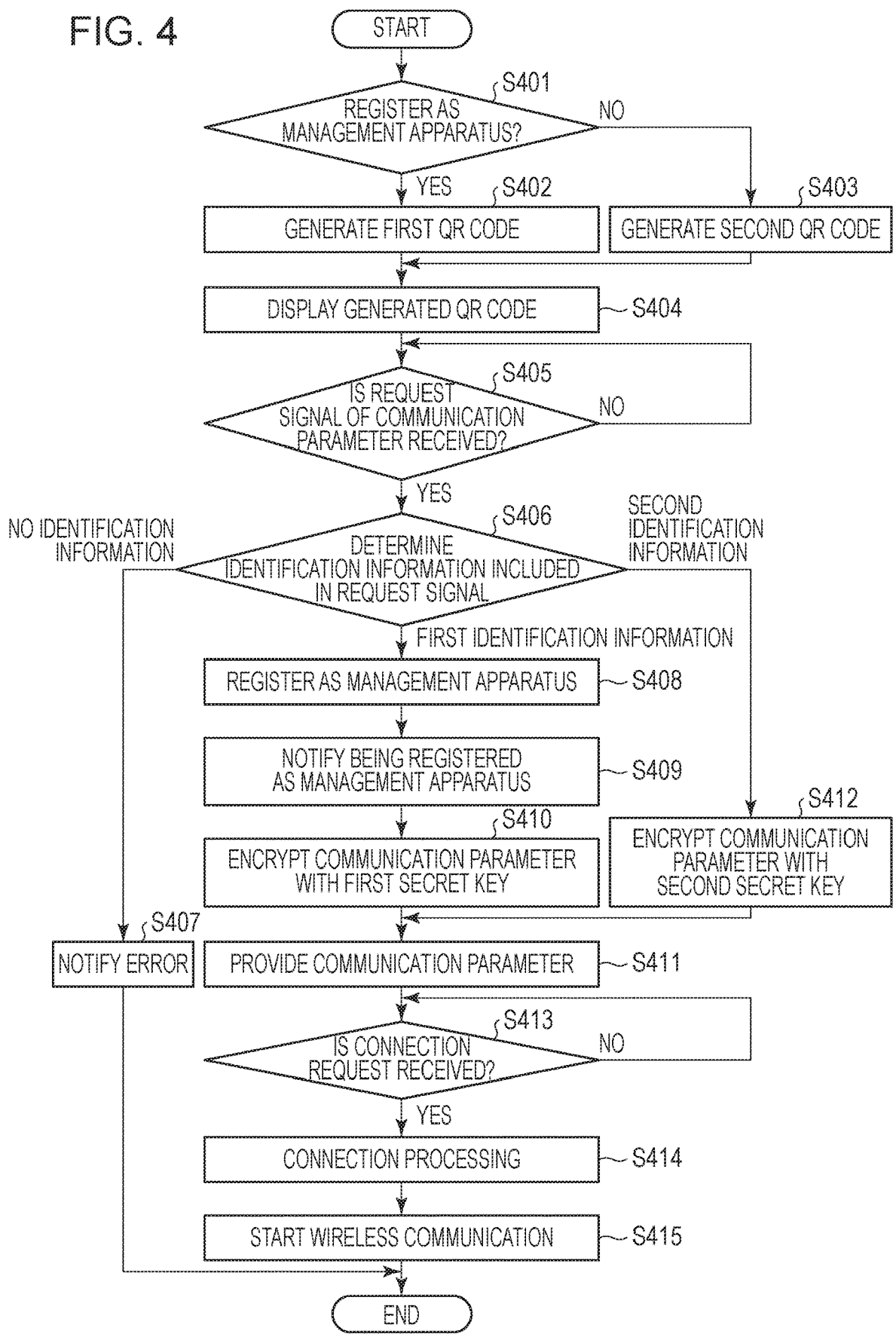
FIG. 4 is a flowchart realized by the communication apparatus.

An operation of the communication system configured as described above will now be described. FIG. 4 illustrates a flowchart realized by the AP 101 when the AP 101 provides the smartphone 102 with a communication parameter. This flowchart is realized when the control unit 202 reads and executes a program stored in the storage unit 201 of the AP 101.

First, the AP 101 enables a user to select whether to provide the communication parameter by registering a partner apparatus as a management apparatus or provide the communication parameter without registering the partner apparatus as the management apparatus (S401). A password may be requested to the user for selecting the option of providing the communication parameter by registering the partner apparatus as the management apparatus. This communication parameter is a communication parameter for connection to the wireless network 104.

When the user selects to provide the communication parameter by registering the partner apparatus as the management apparatus, the AP 101 generates a first QR Code® including first identification information indicating that the partner apparatus is to be registered as the management apparatus (S402). In this case, the first QR Code® further includes an identifier for identifying the AP 101. An example of the identifier includes a MAC address of the AP 101. Note that, UUID (Universally Unique Identifier) may be used as the identifier.

On the other hand, when the user selects to provide the communication parameter without registering the partner apparatus as the management apparatus, the AP 101 generates a second QR Code® including second identification information indicating that the partner apparatus is not to be registered as the management apparatus (S403). In this case, the second QR Code® further includes an identifier for identifying the AP 101. Then, the AP 101 displays the generated QR Code® on the output unit 205 (S404).

Here, the identification information is a public key (one kind of encryption key) of the AP 101. That is, the AP 101 generates the QR Codes® including information of different public keys between steps S402 and S403. However, without limitation thereto, the AP 101 may generate the QR Codes® including information of different certificates of the AP 101 or different fixed values (numerical values, character strings) between steps S402 and S403.

Note that, each of the QR Codes® may not be displayed on the output unit 205 and may be provided on the AP 101 itself or on the packaging the AP 101 is sold in. In addition, each of the QR Codes® may be printed in an instruction manual or the like of the AP 101. In this case, steps of S401 to S404 are omitted. Each of the QR Codes® may be printed instead of being displayed on the output unit 205 at step S404. In this case, steps of S402 to S404 are omitted.

The aforementioned methods may be combined, for example, so that the first QR Code® is provided by being printed in the instruction manual and the second QR Code® is provided by displaying on the output unit 205. Thereby, only the user in possession of the instruction manual is able to register the management apparatus and the terminal is able to be connected to the wireless network 104 easily using the display on the output unit 205. In this case, step of S402 is omitted and the user is notified to refer to the instruction manual instead of the display for the first QR Code® at step S404.

When the QR Code® is displayed, the smartphone 102 captures an image of the QR Code® displayed on the output unit 205. The smartphone 102 transmits a request signal of the communication parameter including the first or second identification information and device identification information of the smartphone 102 to the AP 101. The device identification information includes a MAC address and a public key of the smartphone 102. Instead of the MAC address, UUID may be used.

Next, the AP 101 receives the request signal of the communication parameter from the smartphone 102 (S405). This request signal includes information of the public key of the smartphone 102 in addition to the identification information acquired by the smartphone 102.

When receiving the request signal, the AP 101 judges whether the request signal includes the first identification information or the second identification information, or does not include any of the identification information (S406). That is, the AP 101 determines the identification information included in the request of the communication parameter. When neither of the identification information is included as a result of the judgment, the AP 101 notifies an error through the output unit 205 and notifies the smartphone 102 of an error (S407). Then, the processing illustrated in FIG. 4 ends.

When judging that the first identification information is included as a result of the judgment at step S406, the AP 101 registers the smartphone 102 as the management apparatus (S408). Specifically, the AP 101 adds the MAC address and the public key of the smartphone 102 in association with each other to a management apparatus list of the storage unit 201. The AP 101 then notifies the smartphone 102 that the smartphone 102 is registered as the management apparatus (S409). Note that, the user may be notified through the output unit 205 with the notification to the smartphone 102. In addition, the user may be allowed to appropriately delete the information added to the management apparatus list.

Further, the AP 101 encrypts the communication parameter by using a secret key (first secret key) corresponding to the public key included in the first identification information (S410). In this case, the AP 101 has the secret key corresponding to the public key included in the first identification information because the public key is the public key of the AP 101 as described above. Note that, instead of the encryption with the secret key, the communication parameter may be encrypted with the public key of the smartphone 102 included in the request signal received at step S405.

Subsequently, the AP 101 provides the smartphone 102 with the communication parameter encrypted with the secret key (S411). In this case, the AP 101 is connected to the smartphone 102 once in response to a connection request from the smartphone 102 and provides the communication parameter by wireless communication through the connection. However, without limitation thereto, the AP 101 may provide the communication parameter with use of an action frame using a MAC layer but not using a higher layer such as an IP layer. After providing of the communication parameter, the procedure moves to step S413.

On the other hand, when determining that the second identification information is included as a result of the judgment at step S406, the AP 101 does not register the smartphone 102 as the management apparatus. However, the AP 101 encrypts the communication parameter by using a secret key (second key) corresponding to the public key included the second identification information (S412). In this case, since the public key included in the first identification information is different from the public key included in the second identification information, the first secret key and the second secret key are different encryption keys. Note that, the communication parameter may be encrypted with the pubic key of the smartphone 102 included in the request signal received at step S405.

Then, the AP 101 provides the smartphone 102 with the communication parameter encrypted with the secret key (S411). In this case, the AP 101 provides the communication parameter by using a message conforming to the WPS. That is, the AP 101 provides the communication parameter thorough wireless communication conforming to the IEEE 802.11 series. However, without limitation thereto, the AP 101 may provide the communication parameter thorough other wireless communication by the Bluetooth or the like. After that, the procedure moves to step S413.

At step S413, the AP 101 waits for the connection request based on the communication parameter from the smartphone 102. The smartphone 102 transmits a probe request signal which is a probe signal specifying SSID included in the communication parameter, and detects a probe response signal as a response thereto, to thereby search for the AP 101. When detecting the AP 101, the smartphone 102 transmits the connection request to the AP 101.

Upon reception of the connection request, the AP 101 performs connection processing to the smartphone 102 and connects the smartphone 102 to the wireless network 104 (S414). Then, the AP 101 starts wireless communication with the smartphone 102 in the wireless network 104 (S415).

Figure 5:
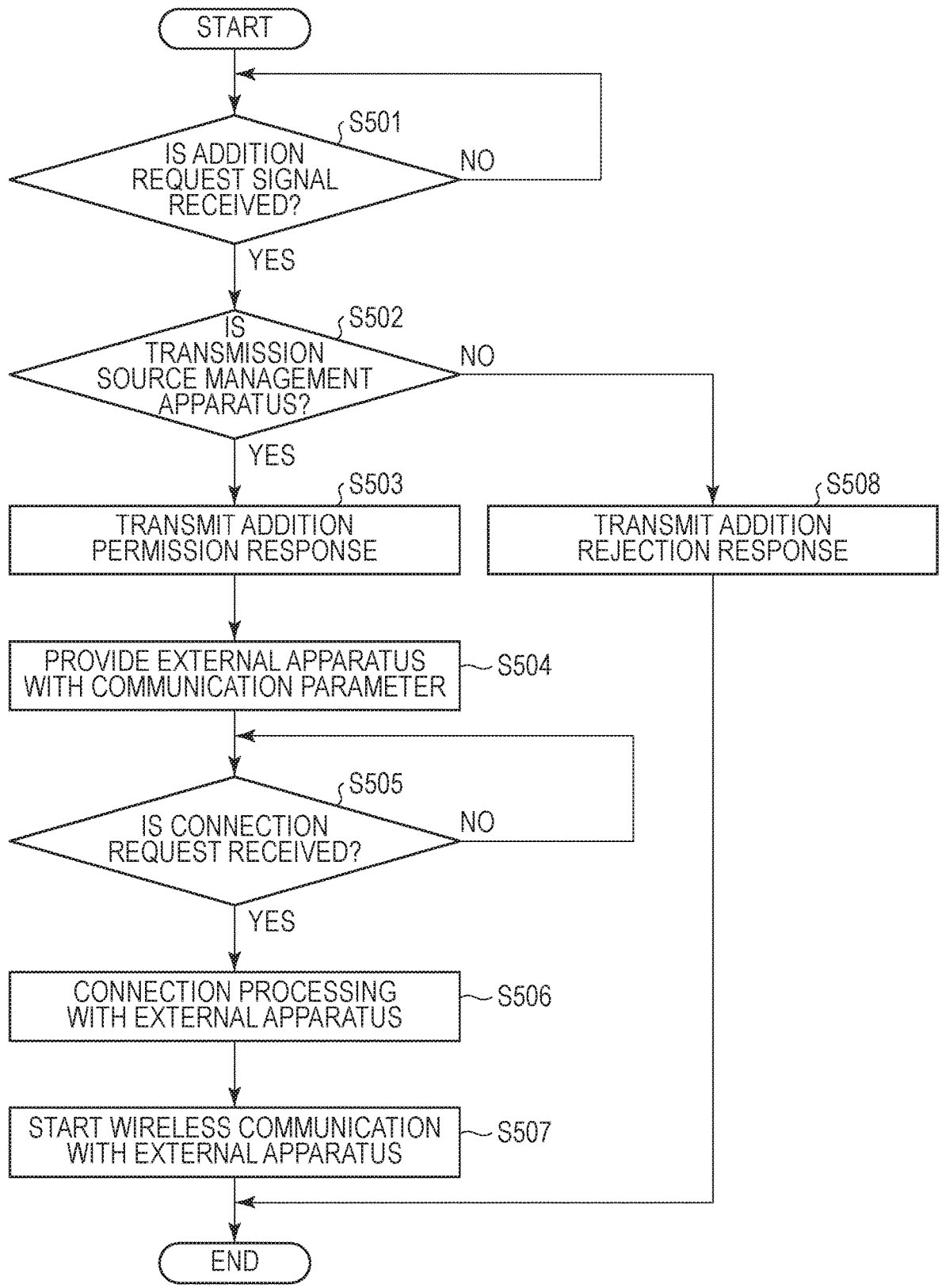
FIG. 5 is a flowchart realized by the communication apparatus.

FIG. 5 illustrates a flowchart realized by the AP 101 when the smartphone 102 requests the AP 101 to connect the printer 105 as an external apparatus to the wireless network 104. This flowchart is realized when the control unit 202 reads and executes a program stored in the storage unit 201 of the AP 101.

First, the AP 101 receives an addition request signal, requesting to connect the printer 105 to the wireless network 104, from the smartphone 102 (S501). When receiving the addition request signal, the AP 101 checks whether the smartphone 102 serving as a transmission source of the addition request signal is registered as a management apparatus (S502). Specifically, a MAC address of the smartphone 102 is included in the addition request signal, and the AP 101 checks whether the MAC address matching the MAC address of the smartphone 102 is registered by referring to the management apparatus list stored in the storage unit 201. Note that, instead of the MAC address, a public key or information of a certificate of the smartphone 102 serving as the transmission source of the addition request signal may be used.

When the smartphone 102 is the management apparatus as a result of the checking, the AP 101 transmits an addition permission response to the smartphone 102 (S503). Then, the AP 101 provides the printer 105 with a communication parameter for connection to the wireless network 104 (S504).

Thereafter, the AP 101 waits for a connection request based on the communication parameter from the printer 105 (S505). Upon reception of the connection request, the AP 101 then performs connection processing to the printer 105 and connects the printer 105 serving as the external apparatus to the wireless network 104 (S506). Thereafter, the AP 101 starts wireless communication with the printer 105 in the wireless network 104 (S507).

On the other hand, when the smartphone 102 is not the management apparatus as a result of the checking at step S502, the AP 101 transmits an addition rejection response (S508) and ends the processing illustrated in FIG. 5. That is, the AP 101 ends the processing illustrated in FIG. 5 without providing the printer 105 with the communication parameter, that is, in a state of non-providing.

As descried above, when providing a terminal with a communication parameter, the base station determines whether or not to register the terminal as a management apparatus. When an addition request of an external apparatus is made from the terminal, the base station provides the external apparatus with the communication parameter according to whether the terminal is registered as the management apparatus.

Thereby, only a specific apparatus is able to have authority for permitting addition of the external apparatus to the wireless network, so that security is able to be enhanced. Since registration of the management apparatus is also performed concurrently with providing of the communication parameter, user convenience is able to be enhanced.

Figure 6:
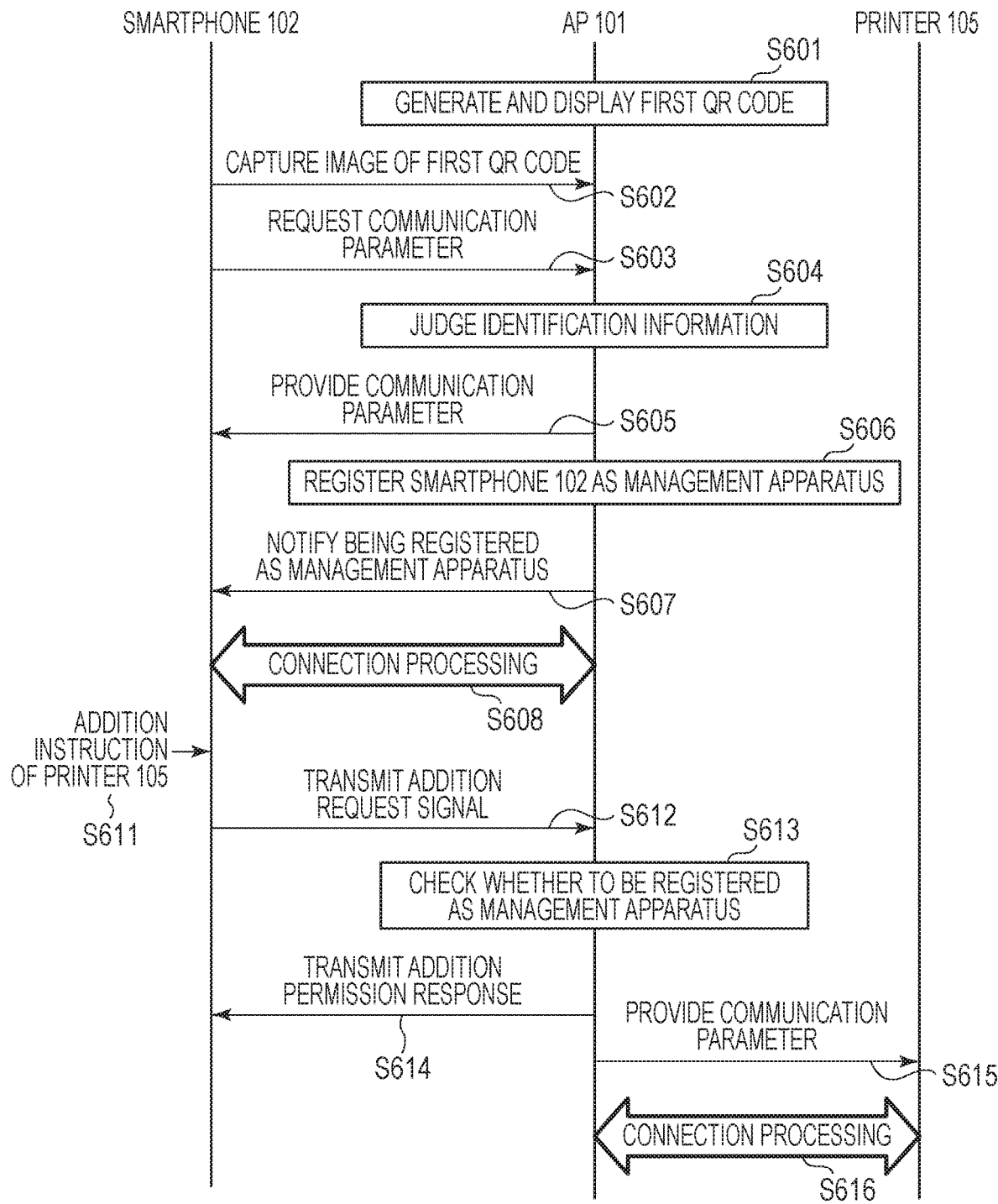
FIG. 6 is a sequence chart between communication apparatuses.

Next, a sequence chart associated with the AP 101, the smartphone 102, and the printer 105 when a user selects to provide a communication parameter by registering a partner apparatus as a management apparatus is illustrated in FIG. 6.

When the user selects to provide a communication parameter by registering a partner apparatus as a management apparatus in the AP 101, the AP 101 generates and displays a first QR Code® including first identification information indicating that the partner apparatus is to be registered as the management apparatus (S601). On the other hand, the smartphone 102 captures an image of the first QR Code® (S602). Then, the smartphone 102 transmits, to the AP 101, a request signal of the communication parameter including the first identification information (including information of a public key) included in the first QR Code® (S603). In this case, since the first QR Code® includes an identifier of the AP 101, the smartphone 102 is able to transmit the request signal to the AP 101.

The AP 101 receives the request signal and judges that the request signal includes the first identification information (S604). Then, the AP 101 encrypts the communication parameter by using a secret key corresponding to the public key included in the request signal and provides the smartphone 102 with the encrypted communication parameter (S605). Further, the AP 101 registers the smartphone 102 as the management apparatus (S606).

Then, the AP 101 notifies the smartphone 102 that the smartphone 102 is registered as the management apparatus (S607). The smartphone 102 notifies the user that the smartphone 102 is registered as the management apparatus. Note that, the processing at step S607 may be omitted. Even if step S607 is omitted, the user is able to know whether or not the smartphone 102 is registered as the management apparatus when an addition instruction described below is given.

After that, connection processing of the AP 101 and the smartphone 102 is performed and the smartphone 102 is connected to the wireless network 104 (S608).

Then, the user of the smartphone 102 gives an addition instruction of the printer 105 (S611). This instruction is given by operating the smartphone 102 by the user. However, without limitation thereto, capturing an image of a QR Code® or the like of the printer 105 by the smartphone 102 may trigger to recognize that the addition instruction is given.

When receiving the addition instruction, the smartphone 102 requests the AP 101 to connect the printer 105 as the external apparatus to the wireless network 104. In this case, the smartphone 102 transmits an addition request signal to the AP 101 (S612).

When receiving the addition request signal, the AP 101 checks whether the smartphone 102 is registered as the management apparatus (S613). Since the smartphone 102 is registered as the management apparatus here, the AP 101 transmits an addition permission response to the smartphone 102 (S614).

Thereafter, the AP 101 provides the printer 105 with the communication parameter (S615). At this time, it may be configured so that the AP 101 acquires a public key from the printer 105, encrypts the communication parameter with the public key, and provides the printer 105 with the encrypted communication parameter. This makes it possible to enhance security when providing the communication parameter. In addition, it may be configured so that the AP 101 passes a public key of the AP 101 to the printer 105, encrypts the communication parameter with a secret key corresponding to the public key, and provides the printer 105 with the encrypted communication parameter. Then, the printer 105 is connected to the wireless network 104 by using the provided communication parameter (S616). Note that, when the communication parameter encrypted with the public key of the printer 105 is provided, the printer 105 may acquire the communication parameter by decoding the communication parameter with use of a secret key corresponding to the public key.

In this manner, it is possible to easily register the smartphone 102 as the management apparatus and connect the printer 105 to the wireless network 104 through the smartphone 102.

Next, a sequence chart between the AP 101 and the smartphone 103 when a user selects to provide a communication parameter without registering a partner apparatus as a management apparatus is illustrated in FIG. 7.

When the user selects to provide a communication parameter without registering a partner apparatus as a management apparatus in the AP 101, the AP 101 generates and displays a second QR Code® including second identification information indicating that the partner apparatus is not to be registered as the management apparatus (S701). On the other hand, the smartphone 103 captures an image of the second QR Code® (S702). Then, the smartphone 103 transmits, to the AP 101, a request signal of the communication parameter including the second identification information (including information of a public key) included in the second QR Code® (S703). In this case, since the second QR Code® includes an identifier of the AP 101, the smartphone 103 is able to transmit the request signal to the AP 101.

The AP 101 receives the request signal and judges that the request signal incudes the second identification information (S704). Then, the AP 101 encrypts the communication parameter by using a secret key corresponding to the public key included in the request signal and provides the smartphone 103 with the encrypted communication parameter (S705). Note that, the AP 101 does not register the smartphone 103 as the management apparatus (S706). After that, connection processing of the AP 101 and the smartphone 103 is performed, and the smartphone 103 is connected to the wireless network 104 (S707).

It is assumed that the user of the smartphone 103 gives an addition instruction of the printer 106 (S711). When receiving the addition instruction, the smartphone 103 requests the AP 101 to connect the printer 106 as the external apparatus to the wireless network 104. In this case, the smartphone 103 transmits an addition request signal to the AP 101 (S712).

When receiving the addition request signal, the AP 101 checks whether the smartphone 103 is registered as the management apparatus (S713). Since the smartphone 103 is not registered as the management apparatus here, the AP 101 transmits an addition rejection response to the smartphone 103 (S714). When receiving the addition rejection response, the smartphone 103 notifies the user of an error. Then, the AP 101 ends the processing without providing the printer 106 with the communication parameter, that is, in a state of non-providing.

In this manner, it is possible to prevent the external apparatus from being connected to the wireless network 104 through the smartphone 103 which is not registered as the management apparatus. Accordingly, it is possible to limit an apparatus which is able to permit connection to the wireless network 104, thus making it possible to enhance security.

Note that, when there is no notification from the AP 101 that the smartphone 103 is registered as the management apparatus, the smartphone 103 may be prevented from selecting the addition instruction itself of the external apparatus. This makes it possible to enhance user convenience. In addition, when receiving the addition request signal a predetermined number of times or more from the smartphone 103, the AP 101 may be disconnected from the smartphone 103 or may not communicate with the smartphone 103 for a predetermined time.

In this manner, only a specific apparatus is able to have authority for permitting addition of the external apparatus to the wireless network, so that security is able to be enhanced. Since registration of the management apparatus is also performed concurrently with providing of the communication parameter, user convenience is able to be enhanced.

Note that, in the aforementioned embodiment, the smartphone 102 transmits the request signal of the communication parameter including first or second identification information to the AP 101. However, without limitation thereto, it may be set that first or second identification information is not included in the request signal of the communication parameter and a signal different from the request signal is used to transmit the first or second identification information to the AP 101.

Moreover, in the aforementioned embodiment, when receiving the request signal of the communication parameter including the second identification information from the smartphone 103, the AP 101 does not register the smartphone 103 as the management apparatus. However, without limitation thereto, an attribute indicating that the smartphone 103 is not registered as the management apparatus may be stored in the storage unit 201. In this case, the AP 101 checks that the smartphone 103 is not registered as the management apparatus by referring to the attribute at step S713.

Further, in the aforementioned embodiment, whether the smartphone acquires the first identification information or the second identification information, setting of a network generated by the AP 101 may be changed. Here, the setting of the network refers to setting of SSID which is a network identifier of the wireless network generated by the AP 101, an encryption method, an encryption key, an authentication method, an authentication key, and the like. Thereby, it is possible to treat the smartphone acquiring the first or second identification information and the smartphone not acquiring these pieces of identification information in discrimination from each other.

The identification information of the smartphone providing the communication parameter at step S411 of the aforementioned embodiment may be stored in association with a public key of the smartphone. Thereby, even when setting of the AP 101 is changed and the communication parameter is to be provided to the smartphone again, the communication parameter is able to be provided by encrypting the communication parameter with a public key of each smartphone, thus enhancing security.

Further, in the aforementioned embodiment, the AP 101 encrypts the communication parameter by using the secret key corresponding to the pubic key included in the first or second identification information. However, without limitation thereto, the communication parameter may be encrypted by using another key generated based on the public key or the secret key, such as hash of the public key or hash of the secret key.

The first or second identification information is included in the QR Code® in the aforementioned embodiment. However, without limitation thereto, the first or second identification information may be included in a one-dimensional bar code or other two-dimensional bar codes. The identification information may be notified to the smartphone 102 by the AP 101 through wireless communication such as the NFC, the Bluetooth, the IEEE 802.11 ad, or the Transfer Jet.

The identification information in the aforementioned embodiment may be an identifier specific to a smartphone, for example, a MAC address. In this case, a similar effect is able to be achieved by registering a MAC address which allows operation as a management apparatus in the AP 101 in advance.

Aspects of the invention can also be realized by a computer of a system or apparatus to which a program for realizing one or more functions of the embodiment are supplied through a network or a storage medium and in which one or more processors thereof read and execute the program. The invention can also be realized by a circuit realizing one or more functions (for example, ASIC).

Aspects of the invention have one or more effects described above.

According to aspects of the invention, since a communication parameter for connection to a wireless network is provided to an external apparatus in response to a request from a specific apparatus, it is possible to enhance security while maintaining user convenience.

OTHER EMBODIMENTS

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While aspects of the present invention have been described with reference to exemplary embodiments, it is to be understood that the aspects of the invention are not limited to the disclosed exemplary embodiments. The scope of the following claims is to be accorded the broadest interpretation so as to encompass all such modifications and equivalent structures and functions.

What is claimed is:

1. A communication apparatus, comprising:
   one or more memories; and
   one or more processors in communication with the one or more memories, wherein the one or more processors and the one or more memories cooperate to function as:
   a receiving unit configured to receive, from a first communication apparatus, a request signal that requests a communication parameter for connection to a wireless network;
   a determining unit configured to determine whether the request received by the receiving unit includes at least one of information on a public key of the communication apparatus and identification information on the first communication apparatus;
   a providing unit configured to execute a providing process in a case where the determining unit determines that at least one of the information on a public key of the communication apparatus and the identification information on the first communication apparatus is included; and
   an outputting unit configured to output an error in a case where the determining unit does not determine that at least one of the information on a public key of the communication apparatus and identification information on the first communication apparatus is included,
   wherein the providing unit performs,
     based on receiving the request signal that includes first information, which is information for causing the first communication apparatus to behave as a management apparatus that is capable of executing processing for providing a second communication apparatus with the communication parameter for connection to the wireless network, notification for causing the first communication apparatus to behave as the management apparatus, and provision of the first communication apparatus with the communication parameter for connection to the wireless network, and
     based on receiving the request signal that does not include the first information, provision of the first communication apparatus with the communication parameter for connection to the wireless network without performing the notification.

2. The communication apparatus according to claim 1, further comprising:

a display unit configured to display the first information to be used for transmitting the request signal by the first communication apparatus.

3. The communication apparatus according to claim 2, wherein the display unit displays the first information using a barcode or a two-dimensional code.

4. The communication apparatus according to claim 2, wherein the display unit includes a selection unit configured to allow a user to select whether or not to display the first information.

5. The communication apparatus according to claim 1, wherein the communication apparatus is an Access Point.

6. The communication apparatus according to claim 1, further comprising:
a storage unit configured to store information regarding the first communication apparatus when the request signal is received by the receiving unit.

7. The communication apparatus according to claim 1, wherein the one or more processors and the one or more memories cooperate to further function as:
a notification unit configured to, in a case where the request signal does not contain a predetermined signal, notify the first communication apparatus of an error without notifying the first communication apparatus of the communication parameter for connection to the wireless network even when the request signal is received by the receiving unit.

8. A method for controlling a communication apparatus, the method comprising:
receiving, from a first communication apparatus, a request signal that requests a communication parameter for connection to a wireless network;
determining whether the request received by the receiving includes at least one of information on a public key of the communication apparatus and identification information on the first communication apparatus;
executing a providing process in a case where the determining determines that at least one of the information on a public key of the communication apparatus and the identification information on the first communication apparatus is included;
outputting an error in a case where the determining does not determine that at least one of the information on a public key of the communication apparatus and identification information on the first communication apparatus is included;
performing, based on receiving the request signal that includes first information, which is information for causing the first communication apparatus to behave as a management apparatus that is capable of executing processing for providing a second communication apparatus with the communication parameter for connection to the wireless network, notification for causing the first communication apparatus to behave as the management apparatus, and providing the first communication apparatus with the communication parameter for connection to the wireless network; and
performing, based on receiving the request signal that does not include the first information, providing the first communication apparatus with the communication parameter for connection to the wireless network without performing the notification.

9. A non-transitory computer-readable storage medium storing a computer program for causing a computer to execute a method for controlling a communication apparatus, the method comprising:
receiving, from a first communication apparatus, a request signal that requests a communication parameter for connection to a wireless network;
determining whether the request received by the receiving includes at least one of information on a public key of the communication apparatus and identification information on the first communication apparatus;
executing a providing process in a case where the determining determines that at least one of the information on a public key of the communication apparatus and the identification information on the first communication apparatus is included;
outputting an error in a case where the determining does not determine that at least one of the information on a public key of the communication apparatus and identification information on the first communication apparatus is included;
performing, based on receiving the request signal that includes first information, which is information for causing the first communication apparatus to behave as a management apparatus that is capable of executing processing for providing a second communication apparatus with the communication parameter for connection to the wireless network, notification for causing the first communication apparatus to behave as the management apparatus, and providing the first communication apparatus with the communication parameter for connection to the wireless network; and
performing, based on receiving the request signal that does not include the first information, providing the first communication apparatus with the communication parameter for connection to the wireless network without performing the notification.

* * * * *